Figure 1:
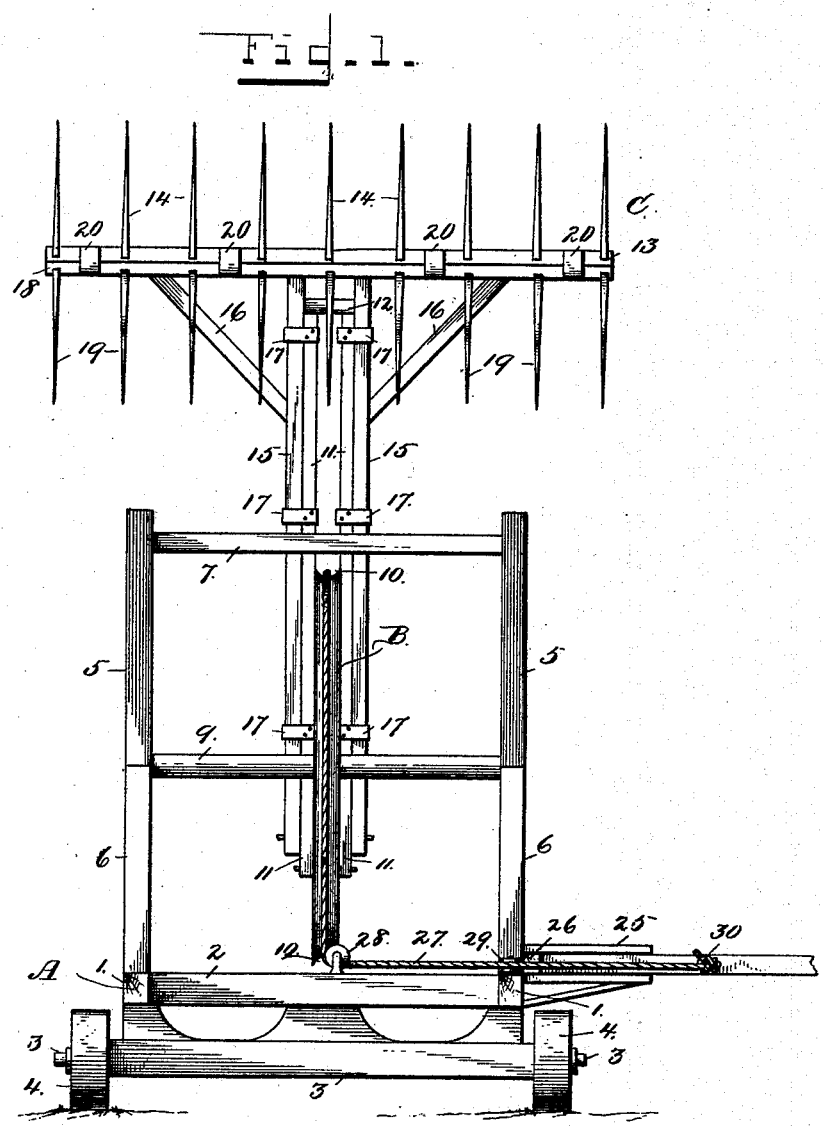

(No Model.) 2 Sheets—Sheet 1.

H. BURGESS & J. A. HELMS.
HORSE HAY FORK.

No. 410,147. Patented Sept. 3, 1889.

Witnesses:
J. Thomson Cross
S. F. Marshall

Inventor:
Harley Burgess,
and Jesse A. Helms.
per A. G. Heylmun
Atty.

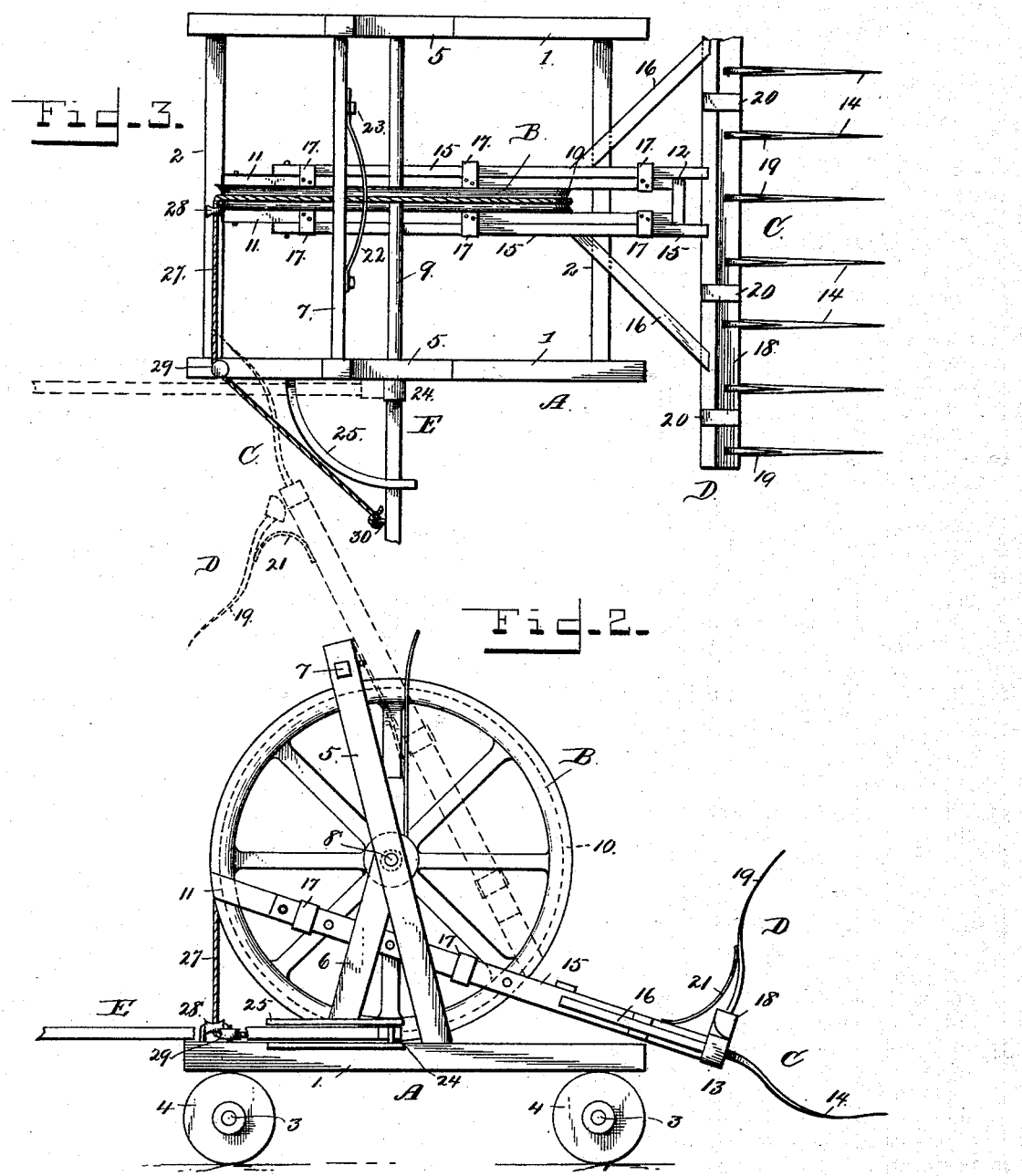

UNITED STATES PATENT OFFICE.

HARLEY BURGESS AND JESSE A. HELMS, OF PITTWOOD, ILLINOIS.

HORSE HAY-FORK.

SPECIFICATION forming part of Letters Patent No. 410,147, dated September 3, 1889.

Application filed February 4, 1889. Serial No. 298,602. (No model.)

*To all whom it may concern:*

Be it known that we, HARLEY BURGESS and JESSE A. HELMS, citizens of the United States of America, residing at Pittwood, in the county of Iroquois and State of Illinois, have invented a new and useful Horse Hay-Fork, of which the following is a specification.

Our invention has relation to improvements in horse hay-forks of that class or kind adapted to lift the hay from the ground and place it on the wagon; and the object is to make a machine of the kind which is simple in construction and so effective and certain in operation that a large quantity of hay or similar material can be lifted and placed at each engagement of the fork.

Our invention consists in the novel construction of parts and their combination, as will be hereinafter fully described, and especially as pointed out in the claims made hereto, as required by the statute.

We have clearly and fully illustrated our improved machine in the accompanying drawings, wherein—

Figure 1 is a perspective view of the machine. Fig. 2 is a side view wherein the elevated fork is shown in dotted lines, and Fig. 3 is a plan view.

In the drawings similar parts are indicated by the same notations, and, reference being had thereto, the letter A designates the bed-frame of the machine, composed of the side pieces 1 and the end cross-pieces 2, all suitably connected. This frame A is supported on axles 3, mounted on wheels 4, substantially as shown in the drawings.

Mounted in the frame A, with their lower ends mortised and secured in the side pieces of the frame, are the uprights 5, which are preferably inclined somewhat toward the rear of the machine, and are finally braced, as at 6, to sustain the strain they may be subjected to. The upper ends of the uprights are connected by a substantial cross-piece 7, and at about the middle of the uprights are formed bearings 8 to receive the journals of the grooved pulleys.

The letter B designates the grooved pulley, which is rigidly mounted on its axle 9, which in turn journals in the bearings 8 of the uprights. This grooved pulley may be of any desired construction, being made with a rim supported by arms in a hub, or it may be of a solid disk, in either construction being formed with a groove 10 in its circumferential face to receive and retain the rope attached to the lever.

Rigidly secured to each side of the pulley B is a substantial rod 11, which supports the rods of the forks, these rods 11 being arranged at such an incline that when the fork is at its lowest resting position the tines shall be in the best position for running under the material to be lifted. Additional security is given to the rods by a cross-piece 12, fastened across their ends, substantially as seen in the drawings.

The letter C designates the fork, which is composed of a substantial head piece or rail 13, having rigidly fixed in it the tines of the fork 14, which are preferably of the form shown. The head-piece is provided with the supporting-rods 15, having their ends fixed therein, and then suitably braced, as at 16, to prevent the fork from twisting or other displacement. The rods 15 are passed through and sustained in sleeves 17 on the rods 11, thus forming an adjustable connection between the fork and the carriage. The connection may be made rigid by set-screws let through the sleeves, or by any desirable means.

The letter D designates the dropping-fork, which is composed of a head-rail 18 and tines 19. The rail of the lifting-fork is provided with two or more bearing-boxes or sleeves 20, in which the head-rail of the dropping-fork is journaled, being disposed therein to make about one quarter-turn in the bearings. The dropping-fork is held in vertical position, as shown in the full lines in Fig. 2, by springs 21, fixed to the braces of the lifting-fork, with their free ends set against the tines of the dropping-fork. When the load is lifted and its weight is thrown on the dropping-fork, these springs are bent down, as shown in dotted lines in Fig. 2, and the load drops by gravity or is easily pulled off. As soon as the fork is relieved of the load, the springs return the dropping-fork to the normal position. To the cross-piece of the uprights is fixed a spring 22, having one end rigidly fixed to the cross-piece and the other end retained in a sleeve or staple 23, in which it is free to slide.

The bow of the spring is thrown forward far enough to act on the rods which sustain the forks, and so that when the forks are thrown upright it will meet the rods, and when the load is discharged throw or aid to throw the forks back and down.

The letter E designates the lever or tongue. This is hinged, as at 24, to the side piece of the frame to turn a quarter-circle on a horizontal plane, and is supported in its horizontality by sliding in the curved arm 25. In the curved arm, next to the side piece of the frame, is disposed a cushion or spring 26, so secured and disposed as to act as a bumper to relieve the frame and tongue or lever from injury when the fork in its progress to the ground draws the lever back. A rope 27 has one end anchored in the groove of the pulley, and thence passes down under a sheave 28 in the frame, thence outward about a sheave 29, and has its end fixed in a staple 30. In the lever or tongue a singletree (not shown) is adjusted to the end of the lever for hitching a draft-animal to.

The operation is as follows: The machine is run up to the material to be lifted, and then pushed forward until the fork is inserted, when the lever is drawn outward and raises the fork, the load on which, when it reaches a vertical position or a backward inclination, is transferred to the dropping-fork, which, not being rigid enough to hold the weight, is turned down and the load is dropped.

What we claim, and desire to secure by Letters Patent, is—

1. The combination, with the supporting-frame and the tongue or lever secured to the side of the frame to swing in a horizontal plane, of the grooved pulley mounted on bearings on the side posts of the frame and having rigidly fixed to it the fork-supporting rods, and the fork having rods fixed to its head-rail and passed through sleeves on the rods on the pulley, substantially as described.

2. The combination, with the grooved pulley journaled in uprights on the carriage and provided with fork-supporting rods, of the lifting-fork adjustably supported by rods resting in sleeves on the rods of the grooved pulley, and the dropping-fork journaled on the head-rail of the lifting-fork, substantially as described.

3. The combination, with the grooved pulley journaled in uprights on the carriage and provided with fork-supporting rods, of the lifting-fork adjustably supported by rods resting in sleeves on the rods of the grooved pulley, the dropping-fork journaled to the head-piece of the lifting-fork, and springs adapted to hold the dropping-fork in vertical position, substantially as described.

In witness whereof we have hereunto set our hands in the presence of two attesting witnesses.

HARLEY BURGESS.
JESSE A. HELMS.

Attest:
GEO. B. DANIELS,
THOMAS BEAN.